United States Patent
Verdier et al.

(10) Patent No.: US 8,623,778 B2
(45) Date of Patent: Jan. 7, 2014

(54) CATALYST COMPOSITIONS BASED ON NANOPARTICLES OF A ZIRCONIUM OXIDE, A TITANIUM OXIDE OR A MIXED ZIRCONIUM/TITANIUM OXIDE DEPOSITED ONTO AN ALUMINA OR ALUMINUM OXYHYDROXIDE SUPPORT THEREFOR

(75) Inventors: Stephan Verdier, Lyons (FR); Guillaume Criniere, Ixelles (BE); Simon Ifrah, Lagord (FR); Rui Jorge Coelho Marques, Paris (FR)

(73) Assignee: Rhodia Operations, Aubervilliers (FR)

( * ) Notice: Subject to any disclaimer, the term of this patent is extended or adjusted under 35 U.S.C. 154(b) by 141 days.

(21) Appl. No.: 12/920,360

(22) PCT Filed: Feb. 23, 2009

(86) PCT No.: PCT/EP2009/052129
§ 371 (c)(1),
(2), (4) Date: Nov. 11, 2010

(87) PCT Pub. No.: WO2009/112356
PCT Pub. Date: Sep. 17, 2009

(65) Prior Publication Data
US 2011/0053763 A1 Mar. 3, 2011

(30) Foreign Application Priority Data

Mar. 5, 2008 (FR) .................................... 08 01203

(51) Int. Cl.
*B01J 23/00* (2006.01)
*B01J 21/00* (2006.01)

(52) U.S. Cl.
USPC .......... 502/242; 502/302; 502/303; 502/304; 502/341; 502/349; 502/351; 502/355; 502/415; 502/439

(58) Field of Classification Search
USPC ........ 502/302–304, 349–351, 355, 415, 439, 502/242, 341; 977/773, 775
See application file for complete search history.

(56) References Cited

U.S. PATENT DOCUMENTS 4,125,536 A * 11/1978 Cobb ............................ 548/411
5,278,123 A * 1/1994 Chopin et al. ................ 502/200
(Continued)

FOREIGN PATENT DOCUMENTS

FR 2697831 A1 5/1994
JP 10277389 A1 10/1998
(Continued)

OTHER PUBLICATIONS

Shmachkova et al., "Formation of supported size-controlled nanoparticles of sulfated zirconia", React. Kinet. Catal. Lett., 2007, pp. 177-185, vol. 91, No. 1, Budapest.
(Continued)

Primary Examiner — Cam N. Nguyen
(74) Attorney, Agent, or Firm — Dentons US LLP

(57) ABSTRACT

Catalyst compositions include finely divided nanoscale particles of at least one supported oxide selected from among zirconium oxide, titanium oxide or a mixed zirconium/titanium oxide deposited onto an alumina-based or aluminum-oxyhydroxide-based support, wherein, after calcination for 4 hours at 900° C., the at least one support oxide is in the form of nanoscale particles deposited onto the support, the size of said particles being at most 10 nm when the at least one supported oxide is based is zirconium oxide and being at most 15 nm when the at least one supported oxide is titanium oxide or a mixed zirconium/titanium oxide; such catalyst compositions are especially useful for the selective reduction of NOx.

16 Claims, 1 Drawing Sheet

(56) References Cited

U.S. PATENT DOCUMENTS

| | | | | |
|---|---|---|---|---|
| 5,352,646 A * | 10/1994 | Blanchard et al. | ............ | 502/263 |
| 5,607,892 A * | 3/1997 | Chopin et al. | ............... | 502/304 |
| 5,883,037 A * | 3/1999 | Chopin et al. | ............... | 502/308 |
| 6,037,289 A * | 3/2000 | Chopin et al. | .................... | 502/2 |
| 6,150,296 A | 11/2000 | Heinerman et al. | | |
| 6,989,345 B2 * | 1/2006 | Lansink Rotgerink et al. | ............................ | 502/240 |
| 7,125,536 B2 * | 10/2006 | Fu et al. | .................... | 423/592.1 |
| 7,323,432 B2 * | 1/2008 | Niihara et al. | ............... | 502/300 |
| 7,374,729 B2 * | 5/2008 | Chen et al. | .................... | 422/177 |
| 7,510,994 B2 * | 3/2009 | Ikeda et al. | .................. | 502/327 |
| 7,569,510 B2 * | 8/2009 | Deevi et al. | .................. | 502/240 |
| 7,618,919 B2 * | 11/2009 | Shimazu et al. | ............... | 502/439 |
| 7,632,775 B2 * | 12/2009 | Zhou et al. | .................. | 502/300 |
| 7,655,137 B2 * | 2/2010 | Zhou et al. | .................. | 208/134 |
| 7,807,605 B2 * | 10/2010 | Gesenhues et al. | ............ | 502/350 |
| 7,820,583 B2 * | 10/2010 | Fu et al. | ........................ | 502/209 |
| 7,879,755 B2 * | 2/2011 | Wassermann et al. | ......... | 502/304 |
| 7,935,653 B2 * | 5/2011 | Shimazu et al. | ............... | 502/302 |
| 7,939,040 B2 * | 5/2011 | Larcher et al. | ................. | 423/263 |
| 7,939,462 B2 * | 5/2011 | Larcher et al. | ................. | 502/304 |
| 8,080,494 B2 * | 12/2011 | Yasuda et al. | ................. | 502/327 |
| 2007/0009417 A1 * | 1/2007 | Wong et al. | .................... | 423/351 |
| 2010/0040523 A1 | 2/2010 | Larcher et al. | | |
| 2010/0111789 A1 | 5/2010 | Fajardie et al. | | |

FOREIGN PATENT DOCUMENTS

| | | |
|---|---|---|
| JP | 2001009279 A1 | 1/2001 |
| JP | 2003251185 A1 | 9/2003 |
| JP | 200506635 A1 | 11/2005 |
| RU | 2191627 C2 | 10/2002 |
| WO | WO 2007/131901 A1 | 11/2007 |
| WO | WO 2008/025753 A2 | 3/2008 |

OTHER PUBLICATIONS

Zhang et al., "Preparation of anatase $TiO_2$ supported on alumina by different metal organic chemical vapor deposition methods", Applied Catalysis A: General, 2005, pp. 285-293, vol. 282, Elsevier Science B.V.

Imagawa et al., "Synthesis and characterization of $Al_2O_3$ and $ZrO_2$-$TiO_2$ nano-composite as a support for $NO_x$ storage-reduction catalyst," Journal of Catalysis, 251 (2007) pp. 315-320.

* cited by examiner

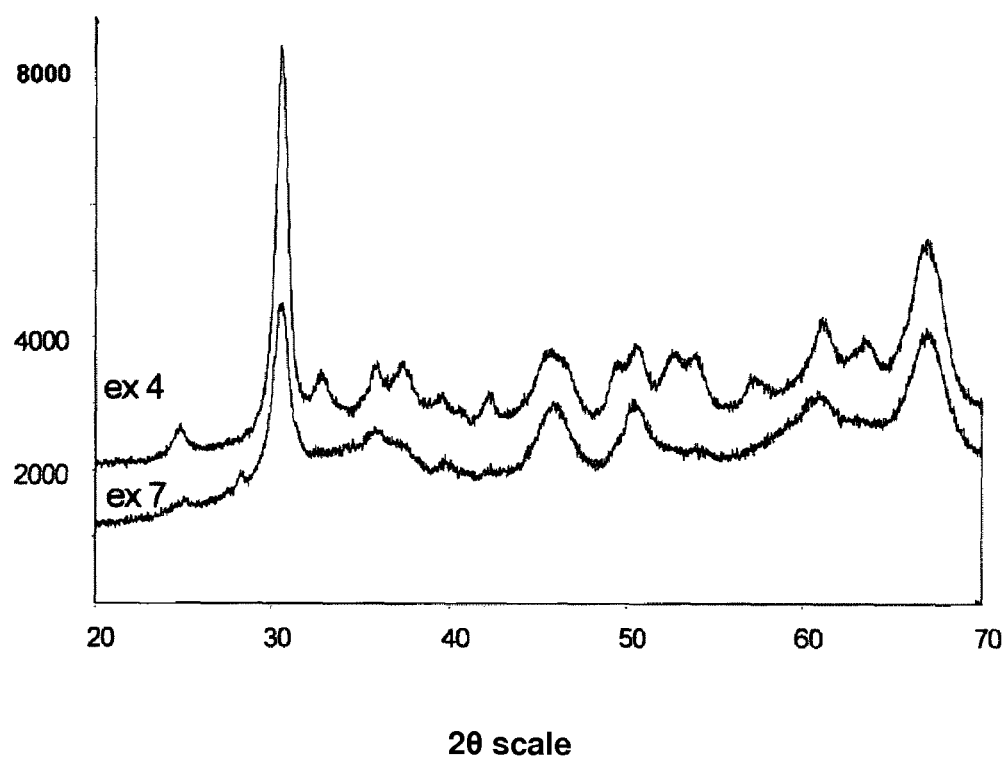

CATALYST COMPOSITIONS BASED ON NANOPARTICLES OF A ZIRCONIUM OXIDE, A TITANIUM OXIDE OR A MIXED ZIRCONIUM/TITANIUM OXIDE DEPOSITED ONTO AN ALUMINA OR ALUMINUM OXYHYDROXIDE SUPPORT THEREFOR

CROSS-REFERENCE TO PRIOR APPLICATIONS

This application is a national stage of PCT/EP 2009/052129, filed Feb. 23, 2009 and designating the United States (published in the French language on Sep. 17, 2009, as WO 2009/112356 A1; the title and abstract were also published in English), claims priority of FR 0801203, filed Mar. 5, 2008, each hereby expressly incorporated by reference in its entirety and each assigned to the assignee hereof.

The present invention relates to a composition based on a zirconium oxide, a titanium oxide or a mixed zirconium titanium oxide on a support based on alumina or aluminum oxyhydroxide, to its methods of preparation and to its use as catalyst.

Catalysts often consist of an active phase, having the desired catalytic properties, and a support on which this active phase is deposited. It is important for catalyst efficiency for the active phase to be dispersed as finely as possible on the support, that is to say this active phase takes the form of fine nonaggregated particles on the support. Furthermore, since catalysts are often exposed to high temperatures, it is also necessary for the finely divided state of the active phase to be maintained even at these temperatures. In other words, there must be no sintering of the particles.

The objective of the invention is to develop catalysts that meet these requirements.

For this purpose, the composition of the invention comprises at least one supported oxide selected from zirconium oxide, titanium oxide and a mixed zirconium titanium oxide on a support based on alumina or on aluminum oxyhydroxide, characterized in that, after calcination for 4 hours at 900° C., the supported oxide is in the form of particles deposited on said support, the size of which is at most 10 nm when the supported oxide is zirconium oxide and at most 15 nm when the supported oxide is titanium oxide or a mixed zirconium titanium oxide.

Other features, details and advantages of the invention will become even more clearly apparent from reading the following description and from the appended drawing in which:

the figure is an X-ray diffractogram of a product according to the invention and of a product of the prior art.

The term "rare earth" is understood to mean the elements of the group formed by yttrium and those elements of the Periodic Table having atomic numbers between 57 and 71 inclusive.

In the rest of the description, the term "specific surface area" is understood to mean the BET specific surface area determined by nitrogen adsorption in accordance with the ASTM D 3663-78 standard established from the Brunauer-Emmett-Teller method described in the periodical The Journal of the American Chemical Society, 60, 309 (1938).

Furthermore, calcinations for a given temperature and for a given time correspond, unless otherwise indicated, to calcinations in air with a temperature hold for the time indicated.

In the rest of the description, it should also be pointed out that, unless otherwise indicated, in all the ranges of values or of limit values given, the values at the limits are inclusive, the ranges of values or limit values thus defined therefore covering any value at least equal and greater to the lower limit and/or at most equal to or less than the upper limit.

The composition of the invention comprises a supported oxide in the form of nanoscale particles, these particles being deposited on a support.

This supported oxide may firstly be a zirconium oxide by itself, i.e. a single oxide, in $ZrO_2$ form.

The supported oxide may also be a doped zirconium oxide, that is to say it may consist of a zirconium oxide and at least one oxide of another element M selected from praseodymium, lanthanum, neodymium and yttrium. In this case, the zirconium oxide $ZrO_2$ is the essential or predominant constituent, the element or elements M then constituting the rest of the supported oxide.

The content of element M is at most 50% by weight, the zirconium oxide constituting at least 50% by weight of the supported oxide. This content is expressed by weight of oxide of the element M or of all of the elements M relative to the mass of the supported oxide in its entirety (zirconium oxide and one or more oxides of the element or elements M). This content of element M may vary widely and may especially be between 5% and 40% and more particularly between 10% and 40%. This content may most particularly be between 10% and 30%.

The supported oxide may also be titanium oxide $TiO_2$.

The supported oxide may also be a mixed zirconium titanium oxide. The term "mixed oxide" is understood here to mean a solid solution of titanium and zirconium oxides in the form of a pure crystallographic phase of $ZrTiO_4$ structure. In this case, analysis of the product using the XRD (X-ray diffraction) technique does not reveal any structure other than the $ZrTiO_4$ structure. This structure corresponds to the JCPDS reference 34-415. This solid solution is generally present with proportions that may be between 30% and 40% by weight of titanium oxide relative to the total weight of the mixed oxide.

It should be noted here that the composition may comprise several types of oxides at the same time on the support, that is to say zirconium oxide particles, titanium oxide particles and mixed oxide particles, each of these oxides being however in the form of particles having the sizes given above.

The supported oxide is of crystalline form.

It should be noted here that the supported oxide particles may either be individual particles or possibly in the form of aggregates.

The size values given in the present description are average sizes determined by the XRD technique. A value measured by XRD corresponds to the size of the coherent domain calculated from the width of the three most intense diffraction lines in the (x,y,z) space group, using the Debye-Scherrer model.

The sizes of the supported oxide particles were given above depending on the supported oxide and on the conditions under which the composition is calcined. As indicated above, the particles are deposited on a support. By this it should be understood that the supported oxide particles are predominantly present on the surface of this support, it being understood that the particles may be present inside the pores of the support but still remaining on the surface of these pores.

Furthermore, the supported oxide is entirely in the form of supported particles, within the above meaning, that is to say, in the compositions according to the invention, there is no part of this oxide which would be present in the form of a simple mixture of this part of the oxide with the rest of the composition which would thus comprise the support and the other part of the oxide in supported form.

Preferably, after calcination for 4 hours at 900° C., the size of the supported oxide particles is at most 9 nm when the supported oxide is an optionally doped zirconium oxide and it is at most 12 nm when the supported oxide is a titanium oxide or a mixed zirconium titanium oxide.

After calcination at 1000° C. for 4 hours, the size of the supported oxide particles is at most 20 nm, preferably at most 17 nm when the supported oxide is an optionally doped zirconium oxide and it is at most 30 nm when the supported oxide is a titanium oxide or a mixed zirconium titanium oxide.

The minimum size of the particles is not critical and may be very small. Purely by way of indication, the size of the particles may be at least 4 nm, more particularly at least 6 nm, when the supported oxide is an optionally doped zirconium oxide and at least 8 nm, more particularly at least 10 nm, when the supported oxide is a titanium oxide or a mixed zirconium titanium oxide. These minimum values are also given here for compositions calcined for 4 hours at 900° C.

The composition of the invention has the advantage, compared to known compositions of the same type, of being able to contain a larger amount of supported oxide without this causing the oxide particles to be sintered when the composition is subjected to high temperatures.

The supported oxide content of the composition of the invention is generally at most 50% by weight of the entire composition. It may especially be at most 30%.

The minimum supported oxide content is that above which a person skilled in the art knows that it is possible to obtain a sufficient catalytic activity, this minimum content being fixed depending on the desired performance of the composition. Merely as an example, this minimum content is generally at least 3% and more particularly at least 4% by weight. It may also be at least 10%, especially at least 15% and even more particularly at least 20%.

The supported oxide content may especially be between 10% and 50%, more particularly between 10% and 30%. It may also be between 15% and 30% or even between 20% and 30%.

The support for the composition of the invention may be firstly based on alumina. Preferably, this support must have a stable high specific surface area, that is to say one that remains at a sufficient value even after exposure to a high temperature.

It is possible to use here any type of alumina able to have a specific surface area sufficient for a catalytic application. Thus, it is possible in particular to use an alumina having a specific surface area of at least 150 m$^2$/g, preferably at least 200 m$^2$/g and even more preferably at least 300 m$^2$/g.

Aluminas resulting from the rapid dehydration of at least one aluminum hydroxide, such as bayerite, hydrargillite or gibbsite and nordstrandite, and/or of at least one aluminum oxyhydroxide, such as boehmite, pseudoboehmite, and diaspore, may be mentioned.

The support may also be based on aluminum oxyhydroxide of the aforementioned type and also having a suitable specific surface area, i.e. as described above with regard to alumina.

According to one particular embodiment of the invention, a stabilized and/or doped alumina or aluminum oxyhydroxide is used. As stabilizing and/or doping element, rare earths, barium, strontium and silicon may be mentioned. As rare earth, cerium, praseodymium, neodymium, lanthanum or a lanthanum-neodymium mixture may most particularly be mentioned. These elements may be used by themselves or in combination. As advantageous combinations, La—Ba, Ba—Pr, La—Pr—Ba and La—Pr combinations may be mentioned.

In the rest of the description, it should be noted that the terms "stabilized", "doped", "stabilizing" and "doping" must be interpreted nonlimitingly, it thus being possible for a doping element to be understood as a stabilizing element, and vice versa.

The stabilized and/or doped alumina or aluminum oxyhydroxide is prepared in a manner known per se, especially by impregnating the alumina or the aluminum oxyhydroxide with solutions of salts, such as nitrates, with the aforementioned stabilizing and/or doping elements, or else by codrying an alumina precursor with salts of these elements before calcination.

Mention may also be made of another way of preparing the stabilized alumina, in which the alumina powder coming from the rapid dehydration of an aluminum hydroxide or oxyhydroxide undergoes a maturation operation in the presence of a stabilizing agent formed by a lanthanum compound and, optionally, a neodymium compound, which compound may more particularly be a salt. The maturation may take place by suspending the alumina in water and then heating to a temperature for example between 70 and 110° C. After the maturation the alumina is subjected to a heat treatment.

Another method of preparation consists of a similar type of treatment, but using barium or strontium.

The stabilizer and/or dopant content, expressed by weight of the oxide of the stabilizer and/or dopant relative to the stabilized and/or doped alumina or aluminum oxyhydroxide, is generally between 1.5% and 35%, or between 1.5% and 25%, especially between 1.5% and 15%. This content may more particularly be between 2.5% and 20%, more particularly between 2.5% and 11% or between 5% and 20%.

According to one particular embodiment, the stabilizer is barium and/or strontium with a content expressed by weight of the oxide of the stabilizer relative to the stabilized alumina or aluminum oxyhydroxide of at most 10%.

Finally, the compositions of the invention may have a high BET specific surface area which, after calcination for 4 hours at 900° C., may be at least 80 m$^2$/g, more particularly at least 120 m$^2$/g and even more particularly at least 150 m$^2$/g. After calcination for 4 hours at 1000° C., these compositions may have a surface area of at least 50 m$^2$/g, more particularly at least 80 m$^2$/g and even more particularly at least 100 m$^2$/g.

The compositions of the invention may be prepared by various methods, which will now be described.

A. First Method of Preparing the Compositions of the Invention

This first method comprises the following steps:
- an aluminum compound is brought into contact with a colloidal dispersion of a zirconium and/or titanium compound and, where appropriate, of a compound of the element M;
- the mixture thus formed is spray-dried; and
- the dried product thus obtained is calcined.

The first step of this method therefore consists in bringing an aluminum compound into contact with the dispersion, forming a mixture from a colloidal dispersion of a zirconium compound or from a colloidal dispersion of a titanium compound or else from a dispersion comprising both a zirconium compound and a titanium compound, depending on the nature of the supported oxide in the composition that it is intended to prepare. For the preparation of a composition in which the supported oxide is a mixture of a zirconium oxide and at least one oxide of another element M, this mixture further includes a colloidal dispersion of an oxide of this element. It is also possible to use a single colloidal dispersion in which the colloids are based on a mixed oxide comprising zirconium oxide and an oxide of the element M. The present description applies of course here to the case in which the supported oxide comprises several elements M and it will be understood that, in this same case, it would be possible to use several dispersions of various elements M or optionally a single colloidal dispersion comprising all the elements M. For the sake of concision, reference will be made in the rest of the description only to a dispersion of an element M, although the description should be understood as applying to the case given above.

The term "colloidal dispersion" denotes any system consisting of fine solid particles of colloidal dimensions, that is to say dimensions lying between about 1 nm and about 100 nm (measured using the technique of quasi-elastic light scattering), based on a zirconium compound, a titanium compound and/or a compound of the element M, the latter compound generally being an oxide and/or a hydrated oxide, in stable suspension in an aqueous liquid phase, it being furthermore possible, optionally, for said particles to contain residual amounts of bonded or adsorbed ions, such as for example nitrate, acetate, chloride or ammonium ions. It should be noted that in such a colloidal dispersion the zirconium, titanium or the element M may be either completely in the form of colloids or simultaneously in the form of ions and in the form of colloids.

A mixture is formed by mixing the dispersion with an aluminum compound. This aluminum compound may be the support itself, especially in the form of an alumina or an aluminum oxyhydroxide, which alumina or aluminum oxyhydroxide should be understood here as being of the type described above and as being able in particular to be stabilized and/or doped as described above or else this may be an alumina precursor, that is to say a compound which, after calcination, may result in alumina. This may be a dried precursor, that is to say one having a loss on ignition of at most 50%, more particularly at most 25%. This compound may thus be selected from aluminum hydroxides or oxyhydroxides. Thus, it may be an aluminum hydroxide, such as bayerite, hydrargillite or gibbsite, and nordstrandite, or an aluminum oxyhydroxide, such as boehmite, pseudoboehmite, and diaspore. The aluminum compound may take the form of a suspension, especially an aqueous suspension.

The mixing is carried out in an aqueous phase, generally in water, for example distilled water or deionized water.

The second step of the method is a drying step.

This is carried out by spray drying.

The term "spray drying" is understood to mean an operation in which the mixture is dried by being sprayed in a hot atmosphere. The spray drying may be carried out by means of any sprayer of a type known per se, for example by a spray nozzle of the showerhead rose or the like. It is also possible to use what are called turbine atomizers. With regard to the various spraying techniques that can be used in the present method, the reader may refer in particular to the fundamental work by Masters entitled "Spray Drying", second edition, 1976, published by George Godwin, London.

The spray-drying output temperature may for example be between 80° C. and 150° C.

The last step of the method is a calcination step.

This calcination serves to develop the crystallinity of the supported product and it may also be adjusted and/or selected according to the subsequent operating temperature required of the composition according to the invention, taking into account the fact that the specific surface area of the product is lower the higher the calcination temperature employed. Such a calcination is generally carried out in air, but a calcination carried out for example in an inert gas or in a controlled (oxidizing or reducing) atmosphere is of course not excluded.

In practice, the calcination temperature is generally limited to a range between 500° C. and 800° C., preferably between 600° C. and 700° C. The calcination time is adjusted in a known manner and may for example vary between 30 minutes and 4 hours, this time generally being shorter the higher the temperature.

B. Second Method of Preparing the Compositions of the Invention

The compositions of the invention may also be prepared by a second method, which will be described below.

This method comprises the following steps:
  a liquid mixture comprising a zirconium or titanium salt and, where appropriate, a salt of the element M and an aluminum compound is formed;
  the mixture thus formed is heated to a temperature of at least 100° C.;
  the precipitate thus obtained is recovered; and
  said precipitate is calcined.

The first step also starts with an aluminum compound and what was said earlier in respect of the first step regarding this compound likewise applies here. However, in this second method, the mixing takes place with a zirconium salt and/or a titanium salt and a salt of the element M in the case of compositions in which the supported oxide is based on a zirconium oxide and on an oxide of another element M. The mixing is carried out in an aqueous phase, generally in water. It should be noted that when an aluminum compound in the form of a suspension is used, this starting suspension may optionally be acidified.

The salts may be selected from nitrates, sulfates, acetates and chlorides.

Thus, examples that may more particularly be mentioned are zirconyl sulfate, zirconyl nitrate and zirconyl chloride. It is also possible to use a titanium oxychloride or a titanium oxysulfate.

The next step of the method is that of heating the liquid mixture thus formed.

The temperature at which the liquid mixture is heated is at least 100° C. and even more particularly at least 130° C. Thus, it may be between 100° C. and 150° C. The heating operation may be carried out by introducing the liquid mixture into a sealed enclosure (a closed reactor of the autoclave type). Under the temperature conditions given above, and in an aqueous medium, it may thus be mentioned, by way of illustration, that the pressure in the closed reactor may vary between a value greater than 1 bar ($10^5$ Pa) and 165 bar ($1.65 \times 10^7$ Pa), preferably between 5 bar ($5 \times 10^5$ Pa) and 165 bar ($1.65 \times 10^7$ Pa). The heating may also be carried out in an open reactor for temperatures close to 100° C.

The heating may be carried out either in air or in an inert gas atmosphere, preferably in nitrogen.

The heating time may vary widely, for example between 1 and 48 hours, preferably between 2 and 24 hours. Likewise, the rate of temperature rise is not critical, and thus the fixed reaction temperature may be reached by heating the liquid mixture for example between 30 minutes and 4 hours, these values being given merely as an indication.

After the heating step, a solid precipitate is recovered which may be separated from its medium by any conventional solid-liquid separation technique such as, for example, filtration, sedimentation, spin drying or centrifugation.

The product as recovered may then undergo a number of washing operations, which are carried out using water or optionally a basic solution, for example an ammonia solution, or else an acid solution, for example a nitric acid solution.

According to one particular variant of the invention, the method includes a maturation.

This maturation is generally carried out on a suspension obtained after resuspending the precipitate in water, especially after the washing. The maturation takes place by again heating this suspension. The temperature at which the suspension is heated is at least 40° C., more particularly at least 60° C. and even more particularly at least 100° C. Generally, this temperature is at most 200° C. and more particularly at most 150° C. The medium is thus maintained at a constant temperature for a time which is usually at least 30 minutes and more particularly at least 1 hour. The maturation may be carried out at atmospheric pressure or optionally at a higher pressure.

The last step of this second method is a calcination step that may be carried out in the same way as in the case of the first method, and therefore what was described above in respect of this calcination likewise applies here.

For the preparation of compositions with a support based on alumina or an aluminum oxyhydroxide stabilized by and/or doped with a stabilizing and/or doping element selected from rare earths, barium and strontium, two other methods (i.e. third and fourth methods) may be employed, which will now be described.

C. Third Method of Preparing the Compositions of the Invention

This third method comprises the following steps:
($a_1$) a liquid mixture is formed that comprises a colloidal dispersion of the supported oxide and, where appropriate, of the oxide of the element M, an aluminum compound, and a compound of the stabilizing element;
($b_1$) the above mixture is brought into contact with a base, whereby a suspension comprising a precipitate is obtained;
($c_1$) the suspension thus obtained is dried; and
($d_1$) the dried product thus obtained is calcined.

The mixing of step ($a_1$) takes place in an aqueous phase, generally in water.

For the supported oxide, any colloidal dispersion of the type described above is used.

The compound of the stabilizing element may be especially a salt, such as a nitrate, an acetate, a chloride or a sulfate, in the form of a solution.

The aluminum compound is of the same type as that described above in the context of the first method.

The second step of the method consists in bringing the mixture obtained in step ($a_1$) into contact with a base.

As base, products of the hydroxide, carbonate or hydroxycarbonate type may for example be used. The following may be mentioned: alkali or alkaline-earth hydroxides and secondary, tertiary or quaternary amines. However, amines and aqueous ammonia may be preferred insofar as they reduce the risks of pollution by alkali or alkaline-earth metal cations. Urea may also be mentioned.

The contacting step may be carried out in any order in a liquid medium.

More particularly, the step of contacting the base is carried out when the pH of the reaction mixture becomes at least 7.

The step of contacting with the base leads to the formation of a precipitate in suspension in the liquid reaction medium.

According to a variant of this method, the latter may include an optional additional step that consists in subjecting the suspension resulting from the above step ($b_1$) to a maturation. The maturation is carried out by heating the suspension at a temperature of at least 60° C., more particularly at least 80° C. Generally, this temperature is at most 200° C., more particularly at most 150° C. The medium is thus maintained at a constant temperature for a time which is usually at least 30 minutes and more particularly at least 1 hour. The maturation may be carried out at atmospheric pressure or optionally at a higher pressure.

After step ($b_1$), or optionally after the maturation step when this is carried out, steps ($c_1$) and ($d_1$) mentioned above are carried out. These two steps are similar to the last two steps of the first method of the invention, and everything described above likewise applies to these steps ($c_1$) and ($d_1$). However, it should be noted that the drying may be carried out by any means other than spray drying, for example in an oven.

In the context of this third method, a variant may be used that consists, after step ($b_1$), or optionally after the maturation step when this is carried out, in separating the precipitate from the suspension, washing it and redispersing it in water in order to form a second suspension. It is this latter suspension which is then dried in step ($c_1$).

D. Fourth Method of Preparing the Compositions of the Invention

This fourth method of preparation comprises the following steps:
($a_2$) a liquid mixture is formed that comprises a colloidal dispersion of the supported oxide and, where appropriate, of the oxide of the element M, and an aluminum compound;
($b_2$) the above mixture is brought into contact with a base, whereby a suspension comprising a precipitate is obtained;
($c_2$) a compound of the stabilizing element is added to the suspension thus obtained;
($d_2$) the suspension resulting from the previous step is dried; and
($e_2$) the dried product thus obtained is calcined.

This method differs from the third method by the fact that the compound of the stabilizing element is provided in a different step, after step ($b_2$) or optionally after a maturation step which, here too, may be implemented after step ($b_2$). Therefore, everything described in the case of the third method likewise applies here. The compound of the stabilizing element is especially of the type as described above. Moreover, it is also possible to implement the variant described above in the case of the third method, in which, after step ($b_2$) or optionally after the maturation step when this is implemented, the precipitate is separated from the suspension, washed and then redispersed in water in order to form a second suspension. In this case, the compound of the stabilizing element is added to this second suspension.

The fourth method described here applies most particularly to the case in which the stabilizing element is barium or strontium.

E. Fifth Method of Preparing the Compositions of the Invention

This fifth method comprises the following steps:
a liquid mixture is formed that contains an aluminum compound, and at least one zirconium or titanium salt and, where appropriate, a salt of the element M;
a base is brought into contact with the above mixture so as to form a precipitate;
the precipitate thus obtained is recovered; and
said precipitate is calcined.

The first step of this fifth method is similar to the first step of the second method and what was described above in this regard therefore likewise applies here.

The second step consists in obtaining a precipitate by reacting the mixture formed in the previous step with a base. What was described above in respect of step ($b_1$) of the third method likewise applies here.

More particularly, the contacting with the base is carried out until the pH of the reaction mixture becomes at least 7.

It is also possible, after this second step, for the suspension to undergo maturation under the same conditions as those given in the description of the third method.

The precipitate is recovered and calcined in the same manner as described above in respect of the second method particularly.

The compositions of the invention as described above or as obtained by the previously described methods take the form of powders, but optionally they may undergo a forming operation to make them into granules, beads, cylinders or honeycombs of variable dimensions.

The compositions of the invention may be used as catalysts. Thus, the invention also relates to catalytic systems comprising the compositions of the invention. These systems comprise a washcoat having catalytic properties based on these compositions and on a binder of known type, the washcoat being applied to a substrate, for example of the metallic or ceramic monolith type. This washcoat is obtained by mixing the composition with the binder so as to form a suspension that can then be deposited on the substrate.

These catalytic systems and more particularly the compositions of the invention may have very many applications. Thus, they are particularly well suited to, and therefore usable in, a catalysis of various reactions such as, for example, the dehydration, hydrosulfuration, hydrodenitrification, desulfuration, hydrodesulfuration, dehydrohalogenation, reforming, steam reforming, cracking, hydrocracking, hydrogenation, dehydrogenation, isomerization, dismutation, oxychlorination and dehydrocyclization of hydrocarbons or other organic compounds, oxidation and/or reduction reactions, the Claus reaction, the treatment of exhaust gases for internal combustion engines, in particular for postcombustion in automobiles and especially three-way catalysis, demetallization, methanation, shift conversion, catalytic oxidation of soot emitted by internal combustion engines, such as diesel or gasoline engines operating with a lean mixture. Finally, the catalytic systems and the compositions of the invention may be used as catalyst for the selective reduction of NOx, by reduction reaction of these NOx by any reducing agent of the hydrocarbon type, or by ammonia or urea and, in this case, as catalyst for the hydrolysis or decomposition reaction of urea to ammonia (the SCR process).

In these uses in catalysis, the compositions of the invention may be employed in combination with precious metals or with transition metals in oxide, sulfide or other form, and they thus act as support for these metals. The nature of these metals and the techniques for incorporating them into the support compositions are well known to those skilled in the art. For example, the metals may be gold, silver, platinum, rhodium, palladium or iridium, molybdenum, tungsten, nickel, cobalt, manganese or vanadium. They may be used by themselves or in combination and may especially be incorporated into the compositions by impregnation.

To treat exhaust gases, the aforementioned systems are mounted in a known manner in the exhaust lines of motor vehicles.

Examples will now be given.

EXAMPLE 1

This example relates to the preparation, using the first method of the invention, of a composition based on zirconium oxide dispersed on an alumina support in respective proportions by weight of oxide of 30% and 70%.

Firstly, a colloidal $ZrO_2$ solution was prepared. To do this, a concentrated $ZrO(NO_3)_2$ solution was diluted with deionized water in order to obtain 600 ml of a $ZrO(NO_3)_2$ solution containing 80 g/l eq. $ZrO_2$, the pH of the solution being 2. A 28% $NH_3$ solution was instantly added so that the final pH reached 10 and the formation of a precipitate was observed. The precipitate was filtered and then washed with 6 l of deionized water. The cake was resuspended in deionized water (pH=7.5) and acidified by adding a 68% $HNO_3$ nitric acid solution in such a way that the concentration was 10 eq.wt % $ZrO_2$. After stirring overnight, a colloidal solution clear to the eye was obtained, the size of the particles of which were measured by quasi-elastic light scattering, was 4 nm.

Aminocaproic acid (98% 6-aminocaproic acid from Aldrich) was added, with stirring, so as to increase and stabilize the pH at 4.5, to 430 g of this colloidal solution followed by, again with stirring, 100 g of gamma transition alumina powder calcined at 500° C., having a surface area of 320 m$^2$/g, a pore volume of 0.82 cm$^3$/g and a loss on ignition of 5.1%. The suspension thus obtained was kept stirred for 30 minutes and then spray-dried at 110° C. (outlet temperature 110° C.; inlet temperature 220° C.) with a flow rate of 1 l/h. The powder obtained was calcined in air at 700° C. for 4 hours.

EXAMPLE 2

This example relates to preparation according to the fifth method of the invention of a zirconium-oxide-based composition on an alumina support in respective proportions by weight of oxide of 30% and 70%.

44.25 g of the alumina powder according to example 1 were mixed, with stirring, in a reactor into 420 ml of water to which 14.5 g of concentrated $HNO_3$ had been added in order to obtain a pH of 1.5. Next, 89.45 g of $ZrO(NO_3)_2$ diluted in 138.3 ml of water were added, after which 10% $NH_4OH$ was introduced so as to bring the pH to 7.

The whole mixture was transferred to an autoclave and heated, with stirring, at 300 tr/min at 150° C. for 4 hours.

The cooled mixture was separated by filtration and washed isovolumetrically 3 times with water at ambient temperature. The cake was then calcined in air at 700° C. for 4 hours.

EXAMPLE 3

This example relates to the preparation of a titanium-oxide-based composition on an alumina support in respective proportions by weight of oxide of 30% and 70%.

A $TiO_2$ colloidal solution was firstly prepared. 32 g of a $TiOCl_2$ solution (25 eq.wt % $TiO_2$) were cooled to 3-4° C. and then added in one go, with stirring, to 768 g of deionized water maintained at 3-4° C. After this addition, 1 ml of a 20% $NH_3$ solution was added, resulting in the appearance of colloids. The reaction mixture was kept stirred at 3-4° C. for 10 minutes and was then washed by dialysis for 48 hours with deionized water. The washed colloidal solution recovered after this dialysis was concentrated by tangential ultrafiltration, giving a final concentration of 2.1 wt. % $TiO_2$. The size of the aggregates, measured by dynamic light scattering, was 7 nm with a polydispersity index of 0.35.

A mixture containing 70% $Al_2O_3$ and 30% $TiO_2$ was produced by mixing, in a reactor, with stirring, 7 g of alumina powder dispersed in 70 ml of water to which 1 g of concentrated $HNO_3$ had been added in order to obtain a pH of 2. The alumina used was a gamma transition alumina stabilized by silicon, containing 90% alumina and 10% silica by weight and having a specific surface area of 278 m$^2$/g after calcination at 600° C. Next, 142.9 g of the 2.1% $TiO_2$ colloidal solution were added.

The suspension thus obtained was kept stirred for 30 minutes and then spray-dried at 110° C. (outlet temperature 110°

C., inlet temperature 220° C.) with a flowrate of 1 l/h. The powder obtained was calcined in air at 700° C. for 4 hours.

EXAMPLE 4

This example relates to the preparation according to the fifth method of the invention of a $ZrTiO_4$-oxide-based composition on an alumina support in respective proportions by weight of oxide of 30% and 70%.

44.25 g of the alumina powder according to example 1 were mixed in a reactor, with stirring, into 500 ml of water to which 11.4 g of concentrated $HNO_3$ had been added in order to obtain a pH of 1. 52 g of $ZrOCl_2$ and 28.2 g of $TiOCl_2$ diluted in 203 ml of water were then added, after which 95 g of 10% $NH_4OH$ (10 ml/min) were added so as to bring the pH to 7.

Next, the mixture was autoclaved, washed and calcined in the same way as in example 2.

The XRD analysis carried out on the composition as obtained and on this same composition after calcination for 4 hours at 900° C. and for 4 hours at 1000° C. reveals only the presence of the $ZrTiO_4$ phase.

The following examples are comparative examples employing the known technique of impregnation.

COMPARATIVE EXAMPLE 5

This example relates to the preparation of a zirconium-oxide-based composition on an alumina support in respective proportions by weight of oxide of 30% and 70%.

This composition was obtained by the drying impregnation of 36.9 g of the alumina according to example 1 with an aqueous solution containing 74.54 g of $ZrO(NO_3)_2$.

The powder was then dried at 110° C. for 2 hours in a ventilated oven and then calcined in air at 700° C. for 4 hours.

COMPARATIVE EXAMPLE 6

This example relates to the preparation of a titanium-oxide-based composition on an alumina support in the respective proportions by weight of oxide of 30% and 70%.

This composition was obtained by the drying impregnation of 16.39 g of the alumina according to example 1 with 17.09 g of $TiOCl_2$ diluted in water.

The powder was then dried at 110° C. for 2 hours in a ventilated oven and then calcined in air at 700° C. for 4 hours.

COMPARATIVE EXAMPLE 7

This example relates to the preparation of a composition based on a zirconium titanium oxide on an alumina support in the respective proportions by weight of oxide of 30% and 70%.

This composition was obtained by the drying impregnation of 16.39 g of the alumina according to example 1 with an aqueous solution containing 12.39 g of $ZrOCl_2$ and 6.72 g of $TiOCl_2$.

The powder was then dried at 110° C. for 2 hours in a ventilated oven and then calcined in air at 700° C. for 4 hours.

The following table gives the characteristics of the compositions obtained in the various examples, that is to say their BET specific surface area and the size of the supported oxide particles according to the various calcination temperatures.

Each calcination indicated in the table was carried out on the compositions already calcined at 700° C.

It should be noted beforehand that, for the compositions of the invention, namely examples 1 to 4, the XRD analysis carried out on the compositions obtained directly after the methods described in the examples, that is to say after the 700° C. calcination, did not enable the size of the supported oxide particles to be measured.

This meant that the measurement limit associated with the XRD technique was reached, meaning that the size of the particles was less than about 2 nm.

TABLE

| Example | 900° C./ 4 h calcination | | 1000° C./ 4 h calcination | |
|---|---|---|---|---|
| | BET surface area ($m^2/g$) | Particle size (nm) | BET surface area ($m^2/g$) | Particle size (nm) |
| 1 | 128 | 6.5 | 95 | 16.5 |
| 2 | 133 | 8.5 | 98 | 17 |
| 3 | 129 | 10 | 119 | 23 |
| 4 | 130 | 12 | 97 | 19 |
| 5 (comparative) | 127 | 13 | 86 | 23 |
| 6 (comparative) | 75 | 18 | 9 | 169 |
| 7 (comparative) | 101 | 9 | 47 | 11 |

The table shows that the compositions according to the invention generally have supported oxides of markedly smaller particle size than that of the oxides of the compositions obtained by the known technique of impregnation.

In the particular case of example 4, the supported oxide was, after calcination at 900° C. and at 1000° C., in the form of a pure $ZrTiO_4$ phase, whereas in the case of comparative example 7 this oxide was in the form of a mixture of phases, namely $ZrO_2$, $TiO_2$ and $ZrTiO_4$. The size values given in the table for this example 7 correspond to those of the $ZrTiO_4$ particles. The $ZrO_2$ and $TiO_2$ particles themselves have larger sizes, of the order of those obtained for the other comparative examples.

The appended figure is an X-ray diffraction pattern obtained from the products of examples 4 and 7 after calcination at 900° C.

The invention claimed is:

1. A catalyst composition comprising:
  (a) an alumina or an aluminum oxyhydroxide support; and
  (b) finely divided nanoscale particles consisting of supported zirconium oxide or a supported doped zirconium oxide,
  wherein the nanoscale particles are deposited on the support, and
  wherein, after calcination for 4 hours at 900° C., the nanoscale particles of supported zirconium oxide or supported doped zirconium oxide deposited onto said support have a particle size of which is at most 10 nm.

2. The catalyst composition as defined by claim 1, wherein the alumina or on aluminum oxyhydroxide support is stabilized by at least one stabilizing element selected from the group consisting of rare earths, barium, strontium and silicon.

3. A method of preparing a catalyst composition as defined by claim 2, wherein the support is based on alumina or on aluminum oxyhydroxide stabilized by and/or doped with a stabilizing and/or doping element selected from the group consisting of the rare earths, barium and strontium, comprising the following steps:
  ($a_1$) providing a liquid mixture comprising: (i) an aluminum compound selected from the group consisting of alumina, aluminum hydroxides and aluminum oxyhydroxides, (ii) a compound of the stabilizing and/or doping element, and (iii) a colloidal dispersion of zirconium oxide, wherein the mixture further comprises an oxide of an element selected from the group consisting of praseodymium, lanthanum, neodymium and yttrium when the finely divided nanoscale particles consist of a supported doped zirconium oxide;

($b_1$) contacting the above mixture with a base, wherein a suspension comprising a precipitate is obtained;

($c_1$) drying the suspension thus obtained; and ($d_1$) calcining the dried product thus obtained.

4. The method as defined by claim 3, wherein the suspension resulting from step ($b_1$) is subjected to a maturation operation before step ($c_1$).

5. A method of preparing a catalyst composition as defined by claim 2, wherein the support is based on alumina or on aluminum oxyhydroxide stabilized by and/or doped with a stabilizing and/or doping element selected from the group consisting of rare earths, barium and strontium, comprising the following steps:

($a_2$) providing a liquid mixture comprising (i) an aluminum compound selected from alumina, aluminum hydroxides and aluminum oxyhydroxides, and (ii) a colloidal dispersion of zirconium oxide, wherein the mixture further comprises (iii) an oxide of an element selected from the group consisting of praseodymium, lanthanum, neodymium and yttrium when the finely divided nanoscale particles consist of a supported doped zirconium oxide;

($b_2$) contacting the above mixture with a base, wherein a suspension comprising a precipitate is obtained;

($c_2$) adding a compound of the stabilizing and/or doping element to the suspension thus obtained;

($d_2$) drying the suspension resulting from the previous step; and ($e_2$) calcining the dried product thus obtained.

6. The method as defined by claim 5, wherein the suspension resulting from step ($b_2$) is subjected to a maturation operation before step ($c_2$).

7. The catalyst composition as defined by claim 1, having a supported oxide content of at most 50% by weight.

8. The catalyst composition as defined by claim 1, wherein the supported doped zirconium oxide consists of zirconium oxide and an oxide of at least one other element selected from the group consisting of praseodymium, lanthanum, neodymium and yttrium.

9. The catalyst composition as defined by claim 1, wherein, after calcination for 4 hours at 900° C., the size of the supported zirconium oxide nanoscale particles is at most 9 nm.

10. The catalyst composition as defined by claim 1, wherein, after calcination for 4 hours at 1,000° C., the size of the supported zirconium oxide nanoscale particles is at most 20 nm.

11. A method of preparing a catalyst composition as defined by claim 1, comprising the following steps:

(i) forming a mixture by contacting (a) an aluminum compound selected from the group consisting of alumina, aluminum hydroxides and aluminum oxyhydroxides with (b1) a colloidal dispersion of a zirconium compound, wherein the aluminum compound is also contacted with (b2) a compound of an element selected from the group consisting of praseodymium, lanthanum, neodymium and yttrium, when the finely divided nanoscale particles consist of a supported doped zirconium oxide;

(ii) spray-drying the mixture thus formed; and (iii) calcining the dried product thus obtained.

12. A method of preparing a catalyst composition as defined by claim 1, comprising the following steps:

(i) providing a liquid mixture comprising: (a) an aluminum compound selected from the group consisting of alumina, aluminum hydroxides and aluminum oxyhydroxides; and (b) at least one zirconium salt, wherein the mixture further comprises (c) a salt of an element selected from the group consisting of praseodymium, lanthanum, neodymium and yttrium, when the finely divided nanoscale particles consist of a supported doped zirconium oxide;

(ii) heating the mixture thus formed to a temperature of at least 100° C.;

(iii) recovering the precipitate thus obtained; and (iv) calcining said precipitate.

13. A method of preparing a catalyst composition as defined by claim 1, comprising the following steps:

(i) providing a liquid mixture comprising: (a) an aluminum compound selected from the group consisting of alumina, aluminum hydroxides and aluminum oxyhydroxides, and (b) a zirconium salt, wherein the mixture further comprises (c) a salt of an element selected from the group consisting of praseodymium, lanthanum, neodymium and yttrium, when the finely divided nanoscale particles consist of a supported doped zirconium oxide;

(ii) contacting a base with the above mixture to form a precipitate;

(iii) recovering the precipitate thus obtained; and (iv) calcining said precipitate.

14. The method as defined by claim 13, wherein the precipitate obtained after the addition of the base is subjected to a maturation operation.

15. A catalytic system comprising the catalyst composition as defined by claim 1.

16. The catalyst composition as defined by claim 1, comprising at least one supported crystalline oxide.

* * * * *